(12) United States Patent
Blom-Schieber et al.

(10) Patent No.: US 12,165,387 B2
(45) Date of Patent: Dec. 10, 2024

(54) FIBER PLACEMENT TOW END DETECTION USING MACHINE LEARNING

(71) Applicants: The Boeing Company, Chicago, IL (US); University of Washington, Seattle, WA (US)

(72) Inventors: Adriana W. Blom-Schieber, Snohomish, WA (US); Wei Guo, Kirkland, WA (US); Ashis G. Banerjee, Seattle, WA (US); Ekta U. Samani, Seattle, WA (US)

(73) Assignees: The Boeing Company, Chicago, IL (US); University of Washington, Seattle, WA (US)

( * ) Notice: Subject to any disclaimer, the term of this patent is extended or adjusted under 35 U.S.C. 154(b) by 417 days.

(21) Appl. No.: 17/543,224

(22) Filed: Dec. 6, 2021

(65) Prior Publication Data

US 2022/0215651 A1  Jul. 7, 2022

Related U.S. Application Data

(60) Provisional application No. 63/134,416, filed on Jan. 6, 2021.

(51) Int. Cl.
*G06T 5/40* (2006.01)
*G06N 3/08* (2023.01)
(Continued)

(52) U.S. Cl.
CPC ............. *G06V 10/774* (2022.01); *G06N 3/08* (2013.01); *G06T 3/4023* (2013.01); *G06T 5/40* (2013.01);
(Continued)

(58) Field of Classification Search
CPC ...... G06V 10/774; G06V 10/16; G06V 10/32; G06V 10/764; G06V 10/80; G06V 10/82;
(Continued)

(56) References Cited

U.S. PATENT DOCUMENTS 5,562,788 A    10/1996  Kitson et al.
2019/0318444 A1*  10/2019  Juarez ....................... G06T 7/90

OTHER PUBLICATIONS

Rosebrock, A. Intersection over Union (IoU) for object detection. Pyimagesearch (blog), Nov. 7, 2016, 55 pages. Retrieved from the Internet <http://web.archive.org/web/20211106110654/https:/www.pyimagesearch.com/2016/11/07/intersection-over-union-iou-for-object-detection/>.

* cited by examiner

*Primary Examiner* — Stephen P Coleman
(74) *Attorney, Agent, or Firm* — Quinn IP Law

(57) ABSTRACT

A method of inspecting a composite structure formed of plies of tows is provided. The method involves receiving an image of an upper ply overlapping lower plies, the upper ply tow ends defining a boundary between plies, and applying extracted sub-images to a trained machine learning model to detect the upper or lower ply. Probability maps are produced in which pixels of the sub-images are associated with probabilities the pixels belong to an object class for the upper or lower ply. The method may also involve transforming the probability maps into reconstructed sub-images, stitching together a composite image, and applying the composite image to a feature detector to detect locations of tow ends of the upper ply. The method may also involve comparing the locations to as-designed locations of the tow ends, inspecting the composite structure, and indicating a result of the comparison.

32 Claims, 12 Drawing Sheets

(51) Int. Cl.
　　　*G06T 3/4023*　　(2024.01)
　　　*G06T 5/92*　　　(2024.01)
　　　*G06T 7/00*　　　(2017.01)
　　　*G06T 7/73*　　　(2017.01)
　　　*G06V 10/10*　　 (2022.01)
　　　*G06V 10/32*　　 (2022.01)
　　　*G06V 10/764*　　(2022.01)
　　　*G06V 10/774*　　(2022.01)
　　　*G06V 10/80*　　 (2022.01)
　　　*G06V 10/82*　　 (2022.01)

(52) U.S. Cl.
　　　CPC .............. *G06T 5/92* (2024.01); *G06T 7/0004* (2013.01); *G06T 7/73* (2017.01); *G06V 10/16* (2022.01); *G06V 10/32* (2022.01); *G06V 10/764* (2022.01); *G06V 10/80* (2022.01); *G06V 10/82* (2022.01); *G06T 2207/10024* (2013.01); *G06T 2207/20021* (2013.01); *G06T 2207/20076* (2013.01); *G06T 2207/20081* (2013.01); *G06T 2207/20084* (2013.01); *G06T 2207/20212* (2013.01)

(58) Field of Classification Search
　　　CPC ........ G06V 10/454; G06N 3/08; G06N 3/045; G06T 3/4023; G06T 5/40; G06T 5/92; G06T 7/0004; G06T 7/73; G06T 2207/10024; G06T 2207/20021; G06T 2207/20076; G06T 2207/20081; G06T 2207/20084; G06T 2207/20212; G06T 2207/30124; G06T 7/11; G06T 3/4038
　　　USPC ........................................................ 382/103
　　　See application file for complete search history.

FIBER PLACEMENT TOW END DETECTION USING MACHINE LEARNING

CROSS-REFERENCE TO RELATED APPLICATIONS

This application claims priority to U.S. Provisional Application No. 63/134,416, filed Jan. 6, 2021 entitled Fiber Placement Tow End Detection Using Machine Learning, the content of which is incorporated herein by reference in its entirety.

TECHNOLOGICAL FIELD

The present disclosure relates generally to the production of composite structures and, in particular, to the use of trained machine models to detect tow ends in layered materials.

BACKGROUND

Composite structures have become increasingly important in the design, development, and manufacture of a wide variety of sophisticated structures and other products. Some composite structures take the form of laminated materials, where multiple plies of material are combined to form a composite structure. In many situations, the structural performance and integrity of a laminated composite structure can be impacted by the locations of tow ends of the various plies of materials that are present in the material, and can require that the tow ends conform to specific tolerances. Numerous technical challenges are involved with detecting tow ends, determining the locations of the tow ends, and determining whether the various tow ends in a given structure satisfy the relevant design and manufacturing requirements. These technical challenges are often compounded in situations where the characteristics of the given plies, material design, and manufacturing equipment complicate the detection and identification of the tow ends.

Therefore it would be desirable to have a system and method that takes into account at least some of the issues discussed above, as well as other possible issues.

BRIEF SUMMARY

Example implementations of the present disclosure are directed to the production of composite structures and, in particular, to the use of trained machine models to detect tow ends in layered materials. Composite structures formed by laminating or otherwise layering and combining multiple plies of material are often used in connection with the design, development, and manufacturing of vehicles, structures, and other products. Such composite structures are often able to meet and maintain performance characteristics and forms in contexts where non-composite structures would be infeasible or ineffective.

In many modern manufacturing environments, a robot or other automated machine is used to layup or otherwise build a composite structure by laying strips, or tows, of the materials to be laminated, and the tows are aligned such that the ends of contiguous pieces are positioned at or near a designed location. Since the structural performance and integrity of a laminated composite structure can be impacted by the locations of tow ends and their alignment with each other, it is often necessary to identify the tow ends and confirm that they meet the relevant tolerances. While some conventional approaches to automatically detecting tow ends attempt to identify the tow ends in contrast-enhanced images, such approaches are only partially effective, and require manual oversight.

Example implementations of the present disclosure address these and other technical challenges by training a machine learning model and using the trained model to classify pixels in a given image, identify the likely tow ends, and take into account the expected tow-end location from a database or other information source.

The present disclosure thus includes, without limitation, the following example implementations.

Some example implementations provide a method of machine learning model development, the method comprising: receiving an image of an upper object that overlaps one or more lower objects, and including a boundary between the upper object and a lower object of the one or more lower objects; extracting sub-images from the image; labeling the sub-images to produce a training set of images, including assigning each of the upper object and the lower object to a respective one of a first class and a second class in those of the sub-images that include both the upper object and the lower object, and assigning both the upper object and the lower object to the second class in those of the sub-images that include only one of the upper object or the lower object; building a machine learning model for pixel-level classification using the training set of images; and outputting the machine learning model for deployment in which images are applied to the machine learning model to perform the pixel-level classification in which at least one of the upper object or the lower object are detected in the images.

In some example implementations of the method of any preceding example implementation, or any combination of any preceding example implementations, a portion of a sub-image is outside an outer boundary of the image, and extracting the sub-images further includes padding the portion of the sub-image with new pixels.

In some example implementations of the method of any preceding example implementation, or any combination of any preceding example implementations, padding the portion of the sub-image includes padding the portion of the sub-image with the new pixels that have a constant intensity value, or that repeat or mirror intensity values of those pixels on or inside the outer boundary of the image adjacent to the portion.

In some example implementations of the method of any preceding example implementation, or any combination of any preceding example implementations, extracting the sub-images from the image includes extracting only sub-images that are expected to include both the upper object and the lower object.

In some example implementations of the method of any preceding example implementation, or any combination of any preceding example implementations, the method further comprises applying at least some of the sub-images in the training set of images to one or more of a plurality of transformations before the machine learning model is built, each sub-image applied to a transformation selected from the plurality of transformations.

In some example implementations of the method of any preceding example implementation, or any combination of any preceding example implementations, the method further comprises pre-processing the image or the sub-images to increase contrast before the machine learning model is built, the pre-processing including performing one or more of a standardization, histogram equalization or gamma correction.

In some example implementations of the method of any preceding example implementation, or any combination of any preceding example implementations, the upper object and the one or more lower objects are respectively an upper ply and one or more lower plies of a composite structure, and the image includes ends of tows of the upper ply that define the boundary between the upper ply and a lower ply of the one or more lower plies.

Some example implementations provide an apparatus for machine learning model development, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for machine learning model development, the computer-readable storage medium being non-transitory and having computer-readable program code stored therein that, in response to execution by processing circuitry, causes an apparatus to at least perform the method of any preceding example implementation, or any combination of any preceding example implementations.

Some example implementations provide a method of inspecting a composite structure formed of plies that are formed of tows of composite structure, the method comprising: receiving an image of an upper ply that overlaps one or more lower plies of the composite structure, and including ends of tows of the upper ply that define a boundary between the upper ply and a lower ply of the one or more lower plies; extracting sub-images from the image; applying the sub-images to a machine learning model trained to perform a pixel-level classification in which at least one of the upper ply or the lower ply are detected in the sub-images, and corresponding probability maps are produced in which pixels of the sub-images are associated with probabilities the pixels belong to an object class for the upper ply or the lower ply; transforming the corresponding probability maps into reconstructed sub-images; stitching the reconstructed sub-images into a composite reconstructed image; applying the composite reconstructed image to a feature detector to detect line segments in the composite reconstructed image; determining locations of the line segments as locations of the ends of the tows of the upper ply; performing a comparison of the locations to corresponding as-designed locations of the ends of the tows of the upper ply, and thereby inspecting the composite structure; and producing an output that indicates a result of the comparison for inspection of the composite structure based thereon.

In some example implementations of the method of any preceding example implementation, or any combination of any preceding example implementations, the image is a color image, and the method further comprises converting the color image or the sub-images extracted from the color image to monochromic before the sub-images are applied to the machine learning model.

In some example implementations of the method of any preceding example implementation, or any combination of any preceding example implementations, the method further comprises pre-processing the image or the sub-images to increase contrast before the sub-images are applied to the machine learning model, the pre-processing including performing one or more of a standardization, histogram equalization or gamma correction.

In some example implementations of the method of any preceding example implementation, or any combination of any preceding example implementations, extracting the sub-images from the image comprises: accessing a design of the composite structure that indicates the as-designed locations of the ends of the tows of the upper ply; and extracting the sub-images for only those portions of the image that frame the as-designed locations.

In some example implementations of the method of any preceding example implementation, or any combination of any preceding example implementations, a portion of a sub-image that frames an as-designed location is outside an outer boundary of the image, and extracting the sub-images further includes padding the portion of the sub-image with new pixels.

In some example implementations of the method of any preceding example implementation, or any combination of any preceding example implementations, applying the sub-images to the machine learning model includes applying the sub-images to a convolutional neural network having an encoder-decoder architecture.

In some example implementations of the method of any preceding example implementation, or any combination of any preceding example implementations, applying the sub-images to the machine learning model includes for a sub-image of the sub-images: applying the sub-image to transformations selected from a plurality of transformations to produce transformed versions of the sub-image; applying the transformed versions of the sub-image to the machine learning, and the corresponding probability maps include versions of a corresponding probability map for the sub-image; and fusing the versions of the corresponding probability map to produce the corresponding probability map for the sub-image.

In some example implementations of the method of any preceding example implementation, or any combination of any preceding example implementations, transforming the corresponding probability maps includes multiplying the probabilities the pixels belong to the object class for the upper ply or the lower ply with a specific intensity value to obtain pixel values of the reconstructed sub-images.

In some example implementations of the method of any preceding example implementation, or any combination of any preceding example implementations, the method further comprises pseudo-labeling the reconstructed sub-images and thereby producing pseudo-labeled, reconstructed sub-images, including assigning each of the upper ply and the lower ply to a respective one of object classes for the upper ply and the lower ply in those of the reconstructed sub-images that include both the upper ply and the lower ply, and assigning both the upper ply and the lower ply to the object class for either the upper ply and the lower ply in those of the reconstructed sub-images that include only one of the upper ply or the lower ply; and adding the pseudo-labeled, reconstructed sub-images to a training set of images used to train the machine learning model.

In some example implementations of the method of any preceding example implementation, or any combination of any preceding example implementations, pseudo-labeling the reconstructed sub-images includes pseudo-labeling the reconstructed sub-images using the locations of the ends of the tows of the upper ply.

Some example implementations provide an apparatus for inspecting a composite structure formed of plies that are formed of tows of material, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for inspecting a composite structure formed of plies that are formed of tows of material, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIG. 1 presents an image of an example composite structure formed of plies of material with tow ends that may be used in connection with example implementations of the present disclosure;

DETAILED DESCRIPTION

Figure 1:
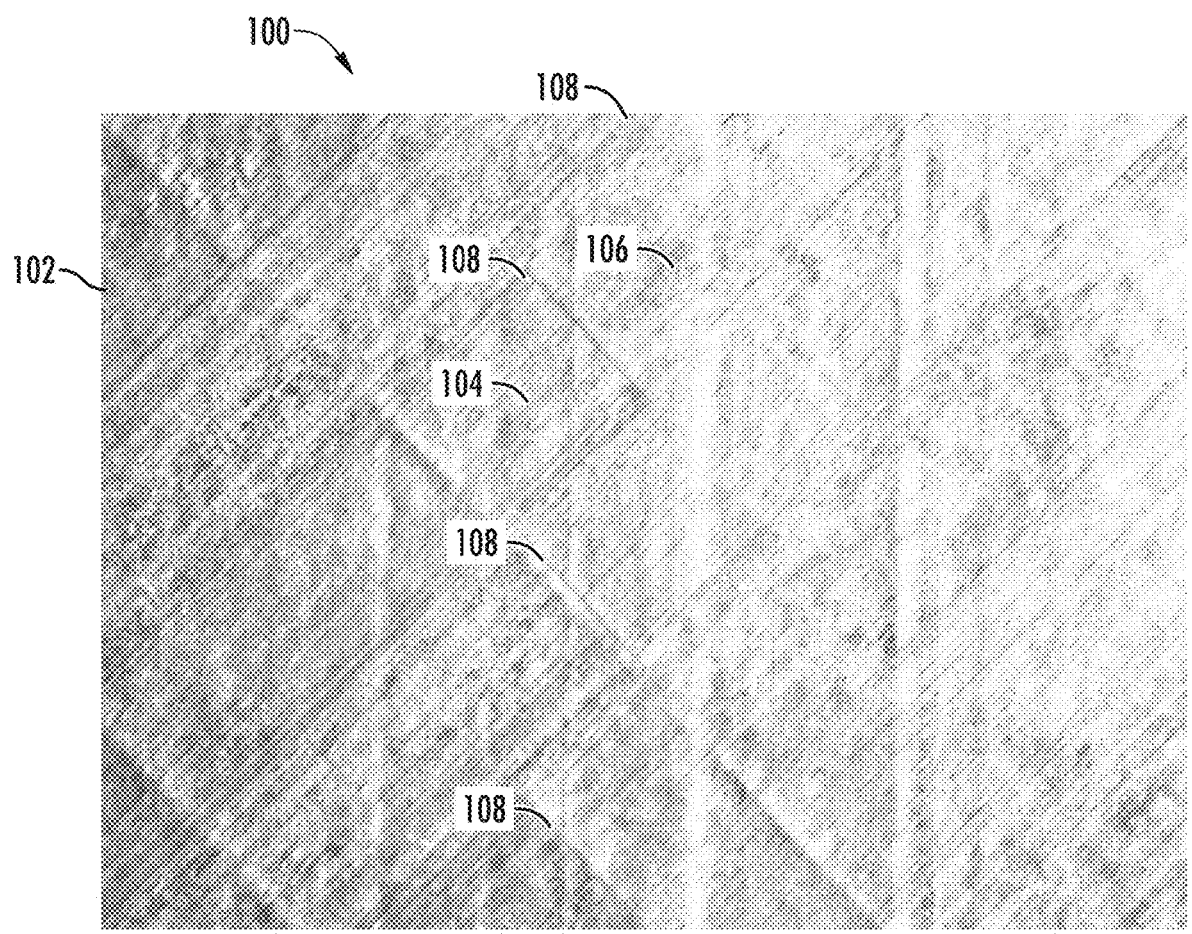

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to the production of composite structures and, in particular, to the use of trained machine models to detect tow ends in layered materials. Composite structures formed by laminating or otherwise layering and combining multiple plies of material are often used in connection with the design, development, and manufacturing of vehicles, structures, and other products to meet and maintain performance characteristics and shapes in situations where non-composite structures would be infeasible or ineffective.

In many modern manufacturing environments, a composite structure is built by a machine that lays tows of the materials to be laminated. During the manufacturing process multiple tows within a course (such as a single machine pass, for example) are placed parallel to each other. Each tow can be started and cut independent of the others. In order to maintain the structural performance and integrity of a laminated composite structure, the locations and alignment of the tow ends must often meet close tolerances. Some conventional approaches to detecting tow ends attempt to identify the tow ends in images by enhancing the contrast of captured images. However, such approaches often fail to identify the tow ends and require manual oversight to find and inspect the tow ends.

Some conventional approaches to detecting tow ends are unable to overcome several technical and practical challenges. For example, the performance of systems applying such conventional approaches varies significantly with the orientation of the plies under observation. This variation in performance can undermine the reliability of such conventional approaches and the confidence users may have in those approaches. Some conventional approaches to detecting tow ends are also susceptible to erroneously detecting shadows or aspects of underlying plies that appear in a given image as tow ends. For example, approaches that use conventional line segment detectors, sub-linear edge detectors, and certain transforms often fail by falsely identifying one or more lines and/or shadows that may be apparent in a given orientation as tow ends, or by failing to differentiate between tow ends on an upper ply and features in a lower ply.

Example implementations of the present disclosure overcome these and other technical challenges. In example implementations of the present disclosure, a machine learning model based on a convolutional neural network or other machine learning architecture is trained and used to classify pixels in a captured image as showing upper layers or lower layers. The machine learning model is trained with captured images of the part that shows upper and lower layers, and their corresponding classifications. The captured image may be rotated, flipped, and/or otherwise altered to create additional images and expand the training set. The use of an expanded training set of images that includes images that may be rotated, flipped and/or otherwise altered can reduce the sensitivity of models trained with such expanded training sets to variations in performance based on the orientation of the material under observation.

The trained machine learning model is then used to predict/identify tow ends in new (unseen) captured images, and the tow end locations can then be assessed against the relevant tolerances. The new captured images may also be rotated, flipped and/or otherwise altered to create additional images. The pixel classifications can be used to create grayscale images based on the probability a pixel belongs a class, which may be used to extract line segments that may show a tow end. Expected tow end locations and orientations can be taken into account during the pixel classification and the line segment extraction by accessing design documentation for the inspected structure. Some example implementations that use such pixel classifications and extracted line segments from the created, probability-based grayscale images are able to identify tow ends without identifying an over-inclusive set of additional line segments that may appear in an image based on shadows, features of underlying plies, or other artifacts in an image.

FIG. 1 shows an image 100 of a composite structure 102. In FIG. 1, the composite structure is constructed by combining multiple plies together. In FIG. 1, the upper ply 104 is positioned over one or more lower plies 106. The boundary of the upper ply is formed by the tow ends 108. As shown in FIG. 1, the precise locations of the tow ends can be difficult to readily identify in an image.

Figure 2:
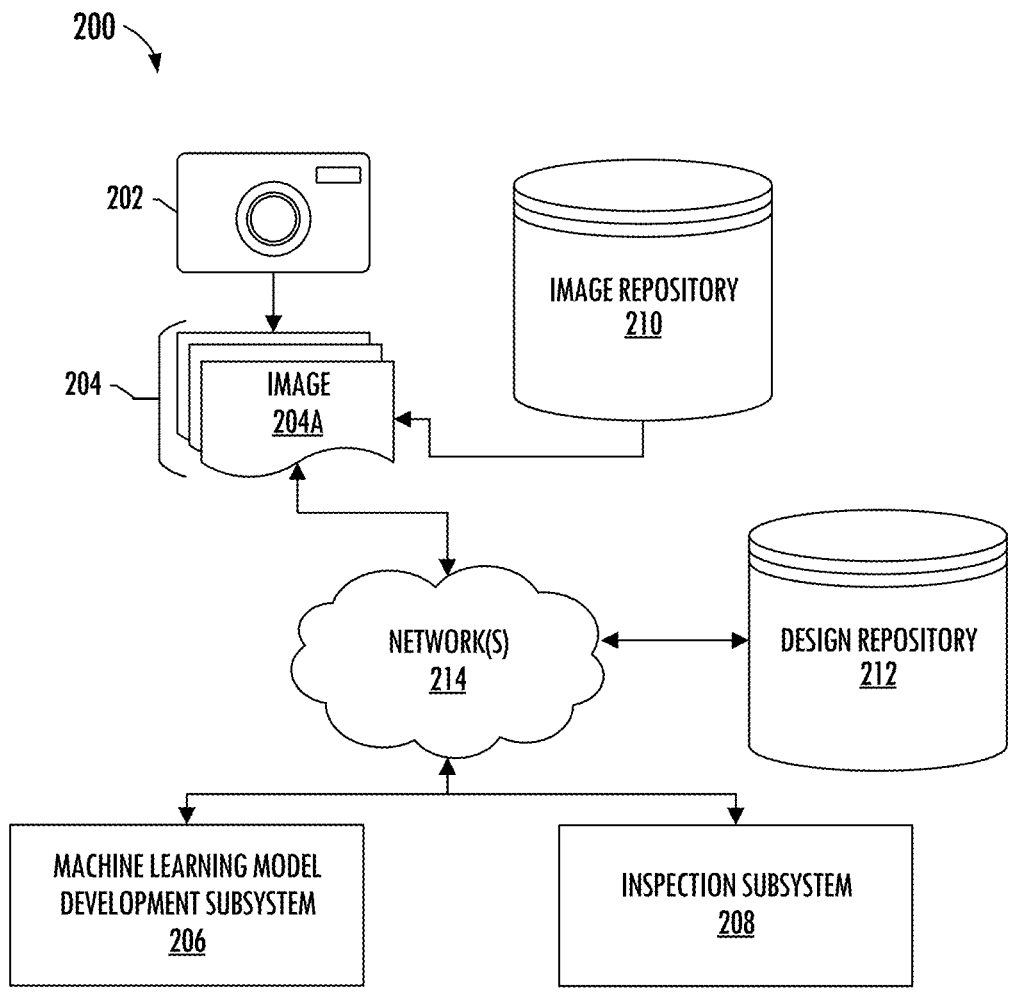
FIG. 2 is a block diagram of a system for machine learning-based inspection of a composite structure, according to example implementations of the present disclosure.

FIG. 2 illustrates a system 200 for the machine learning-based inspection of a composite structure from one or more images such as image 100, according to example implementations of the present disclosure. In some example implementations, the system develops and trains machine learning models to identify features of images of composite structures. The trained machine learning models are then used to inspect tow end locations by processing images captured during the construction of a given composite structure, such as by identifying and inspecting the tow ends of one or more layers of layered composite structures.

The system 200 may include any of a number of different subsystems (each an individual system) for performing one or more functions or operations. As shown, in some examples, the system includes a camera 202 configured to capture one or more images 204 including an image 204A. One example of a suitable image is image 100. As also shown, the system includes a machine learning model development subsystem 206, and an inspection subsystem 208. In some example implementations, the machine learning model development subsystem may access one or more images that have been previously stored in an image repository 210, such as a database. In some example implementations, the inspection subsystem may access design information, such as the expected location of a tow end or other feature, from a design repository 212.

The subsystems including the camera 202, machine learning model development subsystem 206, inspection subsystem 208, image repository 210, and design repository 212 may be co-located or directly coupled to one another, or in some examples, various ones of the subsystems may communicate with one another across one or more computer networks 214. Further, although shown as part of the system 200, it should be understood that any one or more of the above may function or operate as a separate system without regard to any of the other subsystems. It should also be understood that the system may include one or more additional or alternative subsystems than those shown in FIG. 2.

Figure 3A:
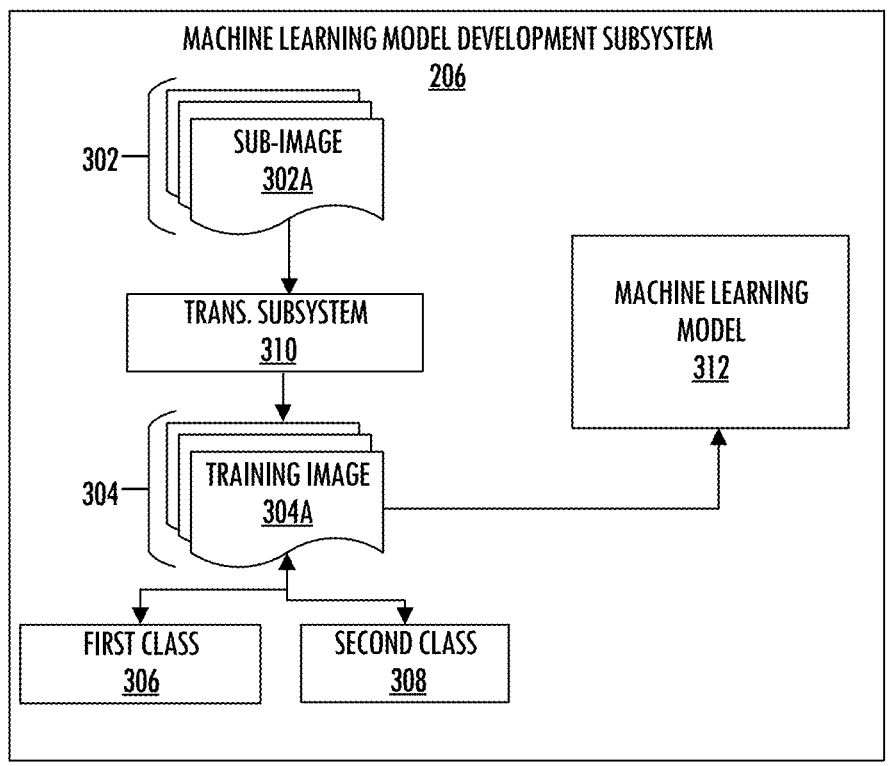
FIG. 3A is a block diagram of a machine-learning model development subsystem, according to example implementations.

FIG. 3A shows a more detailed block diagram of the machine learning model development subsystem 206 shown in FIG. 2, according to some example implementations. While the machine learning model development subsystem is described herein in the context of inspecting a composite structure, the machine learning model development subsystem may be used to develop machine learning models for other structures or arrangements including an upper object that overlaps one or more lower objects. The machine learning model development subsystem is configured to receive an image 204A. The image may be received from the camera 202 or the image repository 210. In some example implementations, the image depicts an upper object that overlaps one or more lower objects, and may depict a boundary between the upper object and a lower object of the one or more lower objects. For example, the image 204A or any other of the images 204 may be similar to the image 100 that depicts an upper object in the form of an upper layer (which may be an upper ply 104 of a composite structure), a lower object in the form of a lower layer (which may be a lower ply 106 of a composite structure), and boundary between the objects in the form of the tow ends 108.

Regardless of the source of the images 204, the machine learning model development subsystem 206 is configured to extract sub-images 302 from an image 204A. The machine learning model development subsystem may be configured to take any of a number of approaches to extracting the sub-images.

In some example implementations, the machine learning model development subsystem 206 is configured to perform additional or alternative operations in connection with extracting sub-images 302 from a given image 204A. For example, the machine learning development subsystem may be configured to extract only sub-images that include depictions of both the upper object (such as upper ply 104) and the lower object (such as lower ply 106).

In situations where the received image is a color image, the machine learning model development subsystem 206 may be configured to convert the color image or the sub-images extracted from the color image to monochromic images or sub-images. In situations where a portion of a given sub-image 302A is outside an outer boundary of the given image 204A, the machine learning model development subsystem may be configured to extract one or more sub-images by padding (or being caused to pad) the portion of the sub-image outside the boundary of the image with new pixels. In some such example implementations, padding the portion of the sub-image 302A performed by the machine learning model development subsystem includes padding (or being caused to pad) the portion of the sub-image with new pixels that have a constant intensity value, or that repeat or mirror intensity values of those pixels on or inside the outer boundary of the image adjacent to the portion that is outside the boundary.

In some example implementations, the machine learning model development subsystem 206 may be configured to apply at least some of the sub-images 302 to one or more of a plurality of transformations that can be performed by a transformation subsystem 310. In some such example implementations, each sub-image 302A is subjected to a transformation selected from the plurality of transformations. Any of a number of transformations may be used. Example transformations include flipping the sub-image horizontally, flipping the sub-image vertically, and/or rotating the image 90 degrees, 180 degrees, 270 degrees, or by another angle. Multiple transformations may be used together, such as by rotating and flipping an image.

In some example implementations, the machine learning model development subsystem 206 is configured to pre-process the image 204A or the sub-images to increase contrast in the image or sub-images. In some such example implementations, the pre-processing includes the machine learning model development subsystem being configured to perform one or more of a standardization, histogram equalization or gamma correction.

The machine learning model development subsystem 206 is configured to label the sub-images 302 to produce a training set of images 304. In some such example implementations, labeling a given sub-image 302A includes assigning each of the upper object (such as the upper ply 104 in image 100) and the lower object (such as the lower ply 106 in image 100) to a respective one of a first class 306 and a second class 308. For example, the machine learning model development subsystem may be configured to assign those of the sub-images that include both the upper object and the lower object to the first class, and to assign both the upper object and the lower object to the second class in those of the sub-images that include only one of the upper object or the lower object.

Figure 4A:
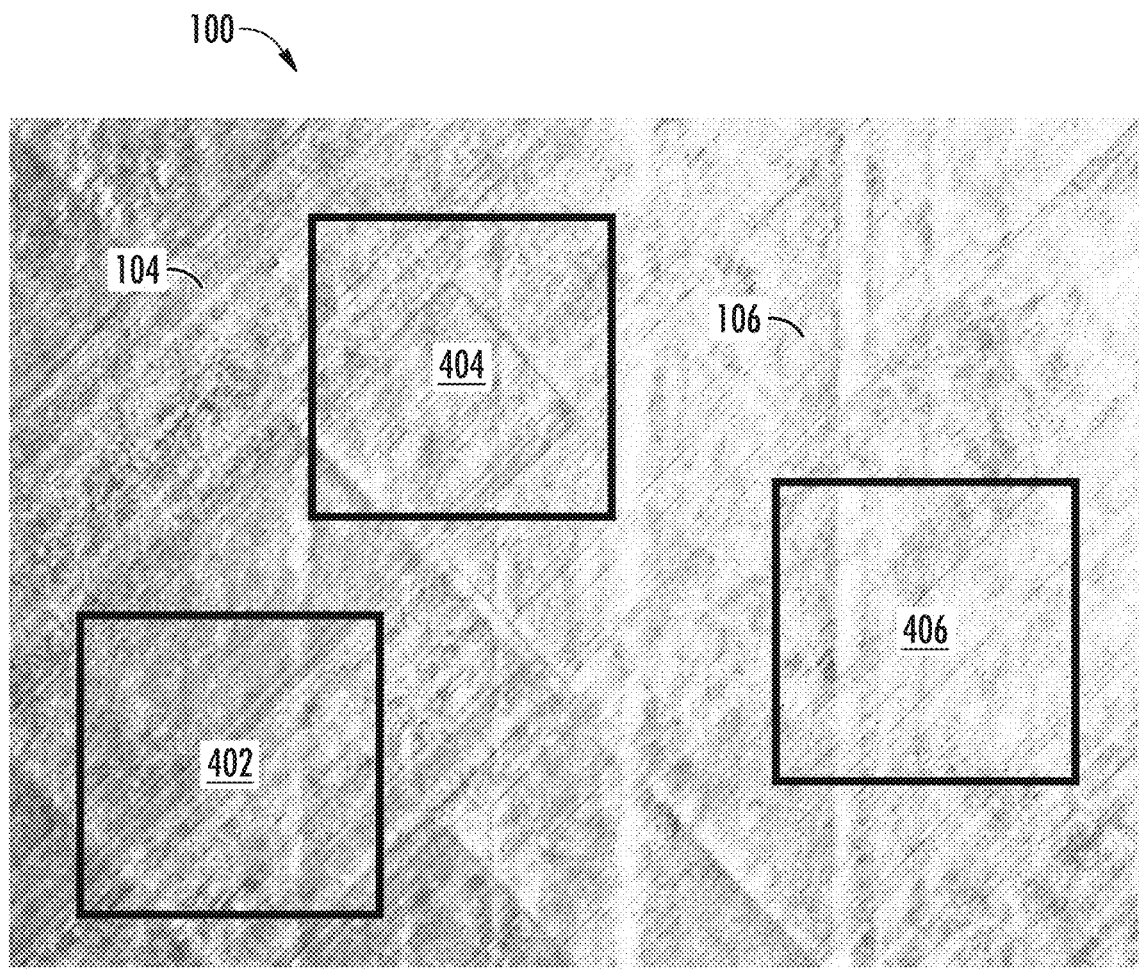
FIG. 4A shows an example image with sub-images that are labeled and classified in accordance with example implementations.

FIG. 4A shows the image 100 of FIG. 1 with sub-images 402, 404, and 406 that are labeled and classified in accordance with example implementations of the present disclosure. In the image, the sub-image 402 includes only the upper object (the upper ply 104, the sub-image 404 includes both the upper object and the lower object (the lower ply 106), and the sub-image 406 includes only the lower object. In accordance with some example implementations, the sub-images 402 and 406 are assigned to the second class 308, as they only include one of the upper object or the lower object. The pixels of the sub-image 404 would appropriately be assigned to at least the first class 306, as it includes both the upper object and the lower object.

Figure 4B:
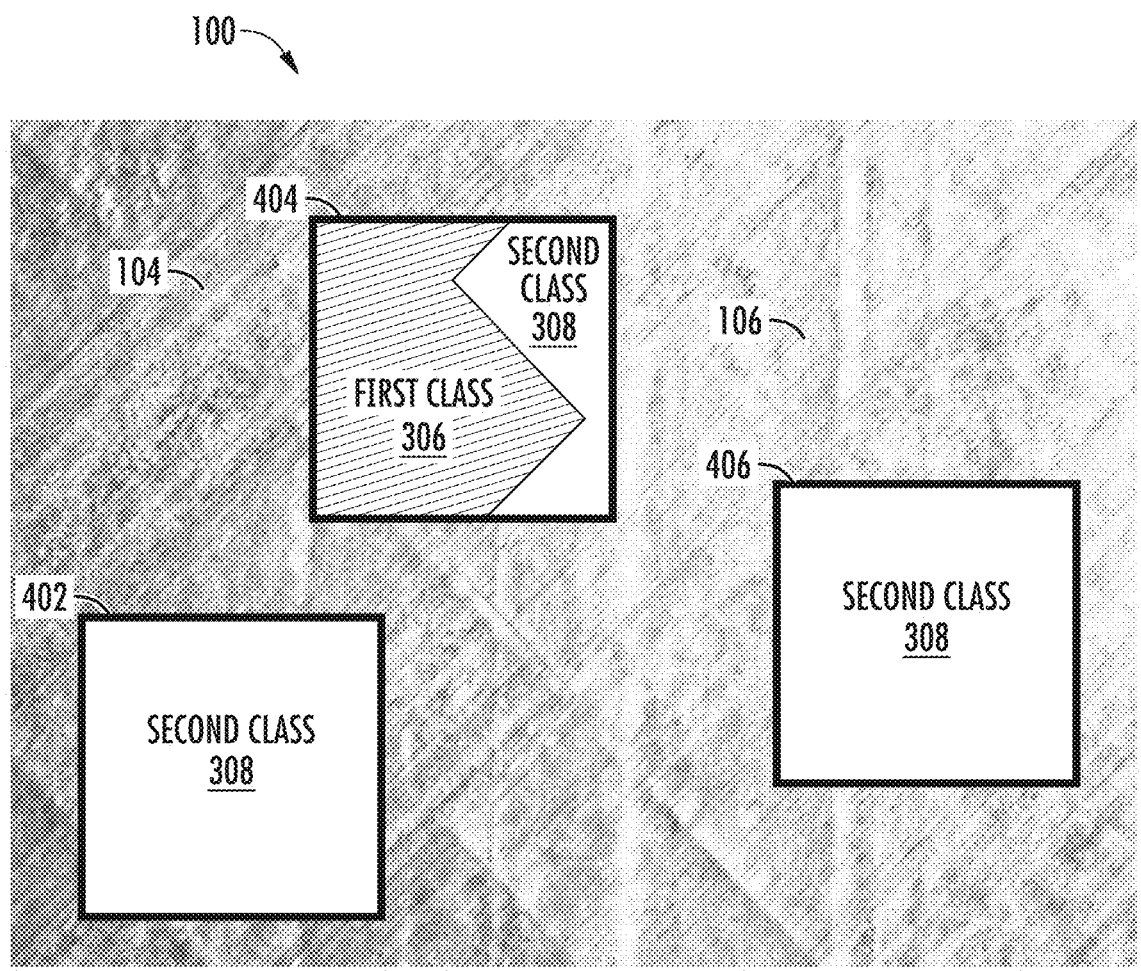
FIG. 4B shows another example image with sub-images that are labeled and classified in accordance with example implementations.

FIG. 4B shows the image 100 of FIG. 1, where the sub-images 402, 404, and 406 are further labeled based on their classification in accordance with example implementations of the present disclosure. As shown in FIG. 4B, the sub-images 402 and 406 are assigned to the second class 308, and the sub-image 404 (which includes pixels associated with the upper object and lower object) is assigned to both the first class 306 and the second class 308.

Returning to FIG. 3A, the machine learning model development subsystem 206 is also configured to build a machine learning model 312. In some example implementations, the machine learning model is built to perform a pixel-level classification using the training set of images 304. In some such example implementations, the machine learning model incorporates a convolutional neural network. However, it will be appreciated that the machine learning model may use and/or incorporate other machine learning architectures suitable for performing pixel-level classifications on one or more images.

In some example implementations, the machine learning model 312 has an encoder-decoder architecture with a deep convolutional neural network such as Xception as the encoder, and a residual neural network (ResNet)-based decoder. In some example implementations, the encoder may be pre-trained on an image database before being incorporated in the convolutional neural network. In some example implementations, one, two, or more residual blocks may be incorporated into one or more layers of the decoder.

In some example implementations, an intersection over union (IOU) score may be used as a performance metric when building and testing the machine learning model 312, and a multi-class Lovasz-softmax loss function may be used to optimize the IOU score. Other optimizers may be used, including but not limited to normalized gradient methods with constant step and occasional decay and/or optimizers with adaptive step sizes. For example, a normalized stochastic gradient descent with cosine annealing and momentum may be used as an optimizer when building the machine learning model.

Once the machine learning development subsystem 206 has built machine learning model 312, the machine learning development subsystem is configured to output the machine learning model for deployment in which images 204 are applied to the machine learning model to perform the pixel-level classification in which at least one of the upper object or the lower object are detected in the images.

Figure 3B:
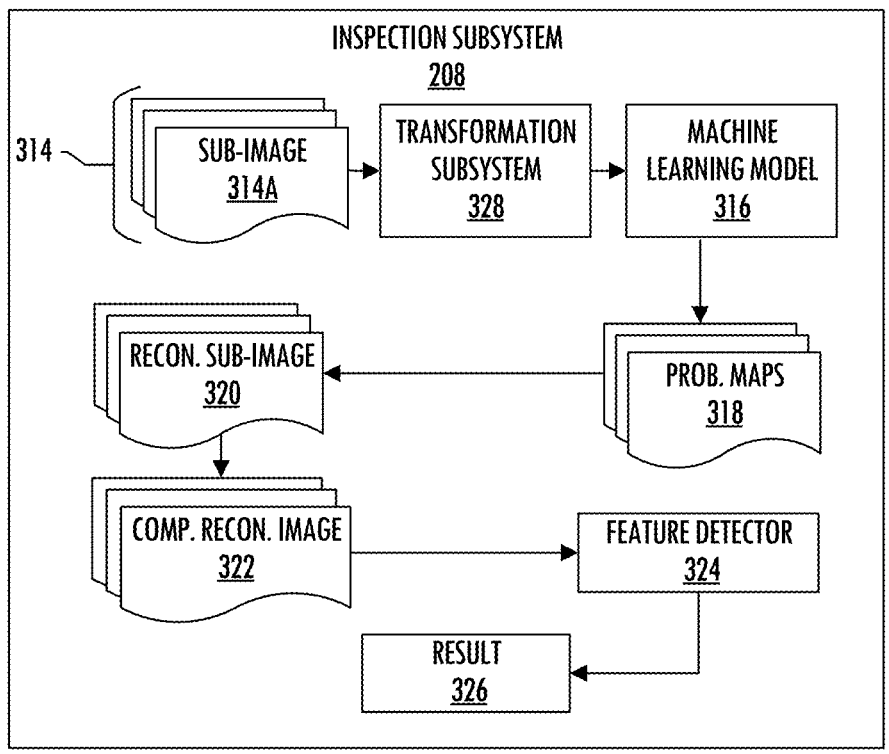
FIG. 3B is a block diagram of an inspection subsystem for inspecting a composite structure formed of plies that are formed of tows of material, according to example implementations.

FIG. 3B shows a more detailed block diagram of the inspection subsystem 208, which is configured for inspecting a composite structure according to example implementations of the present disclosure. The inspection subsystem 208 is configured to receive an image 204A such as from the camera 202 or the image repository 210. In some example implementations, the image depicts an upper object that overlaps one or more lower objects, and may depict a boundary between the upper object and a lower object of the one or more lower objects. As before, the image 204A or any other of the images 204 may be similar to the image 100 that depicts an upper object in the form of an upper ply 104, a lower object in the form of a lower ply 106, and boundary between the objects in the form of the tow ends 108.

The inspection subsystem 208 is also configured to extract sub-images 314 from each received image 204A. The inspection subsystem may be configured to perform any of a number of operations in connection with the sub-images, including any of the operations in connection with sub-images described herein with respect to the machine learning model development subsystem 206. For example, in situations where the received image is a color image, the inspection subsystem may be configured to convert the color image or the sub-images 314 extracted from the color image to monochromic images or sub-images before the sub-images are applied to the machine learning model.

In some example implementations, the inspection subsystem 208 may be configured to pre-process the image or the sub-images 314 to increase contrast. For example, the pre-processing may involve the inspection subsystem being configured to perform one or more of a standardization, histogram equalization or gamma correction.

In situations where a portion of a sub-image that frames an as-designed location is outside an outer boundary of the image 304A, and the inspection subsystem may be configured to extract the sub-images and caused to pad the portion of the sub-image located outside the outer boundary with new pixels.

As with the machine learning model development subsystem 206, the inspection subsystem 208 may be configured to apply at least some of the sub-images 314 to one or more of a plurality of transformations that can be performed by a transformation subsystem 328. In some such example implementations, each sub-image is applied to a transformation selected from the plurality of transformations, such as flipping the sub-image horizontally, flipping the sub-image vertically, and/or rotating the image 90 degrees, 180 degrees, 270 degrees, or by another angle. Multiple transformations may be used together, such as by rotating and flipping an image.

In some example implementations, the inspection subsystem 208 may be configured to attempt to reduce the number of sub-images 314 extracted from a given image 204A, or ensure that the extracted sub-images are likely to be in a location relevant to the detection of a tow end 108 or other feature. For example, the inspection subsystem 208 may be caused to extract the sub-images from the image by being configured to extract only sub-images that are expected to include depictions of both the upper object (such as upper ply 104) and the lower object (such as lower ply 106) based on information from the design repository 212.

In some such example implementations, the inspection subsystem 208 is configured to access a design of the composite structure 102 that indicates the as-designed locations of the ends of the tows of the upper ply 104, such as may be accessed from a database or other design repository 212. In some such example implementations, the inspection subsystem is configured to extract the sub-images 314 for only those portions of the image that frame the as-designed locations.

The inspection subsystem 208 is also configured to apply the sub-images 314 to a machine learning model 316 trained to perform a pixel-level classification of each of the sub-images. In some examples, the machine learning model 316 corresponds to the machine learning model 312 built by the machine learning model development subsystem 206. In this regard, as explained above, the machine learning model is configured such that the inspection subsystem is configured to apply the sub-images to a convolutional neural network having an encoder-decoder architecture. For example, the machine learning model may have an encoder-decoder architecture with a deep convolutional neural network such as Xception as the encoder, and a residual neural network (ResNet)-based decoder. In some example implementations, the encoder may be pre-trained on an image database before being incorporated in the convolutional neural network. In some example implementations, one, two, or more residual blocks may be incorporated into one or more layers of the decoder.

In some example implementations, the machine learning model 316 is configured to perform a pixel-level classification in which at least one of the upper ply 104 or the lower ply 106 are detected in the sub-images 314. In some such example implementations, the machine learning model and the inspection subsystem 208 are configured to produce corresponding probability maps 318 in which pixels of the sub-images are associated with probabilities the pixels belong to an object class for the upper ply or the lower ply. In example implementations where processed and/or transformed versions of sub-images are applied to the machine learning model, the corresponding probability maps 318 may include versions of a corresponding probability map for the sub-image. As such, the inspection subsystem can be further configured to fuse the versions of the corresponding probability map to produce the corresponding probability map for the sub-image.

In some example implementations, the inspection subsystem 208 is further configured to transform the corresponding probability maps 318 into reconstructed sub-images 320. In some such example implementations, the inspection subsystem is further configured to transform the corresponding probability maps by multiplying the probabilities the pixels belong to the object class for the upper ply or the lower ply (such as the classes 306 and 308 shown in FIG. 3A, or the like) with a specific intensity value to obtain pixel values of the reconstructed sub-images.

Figure 5:
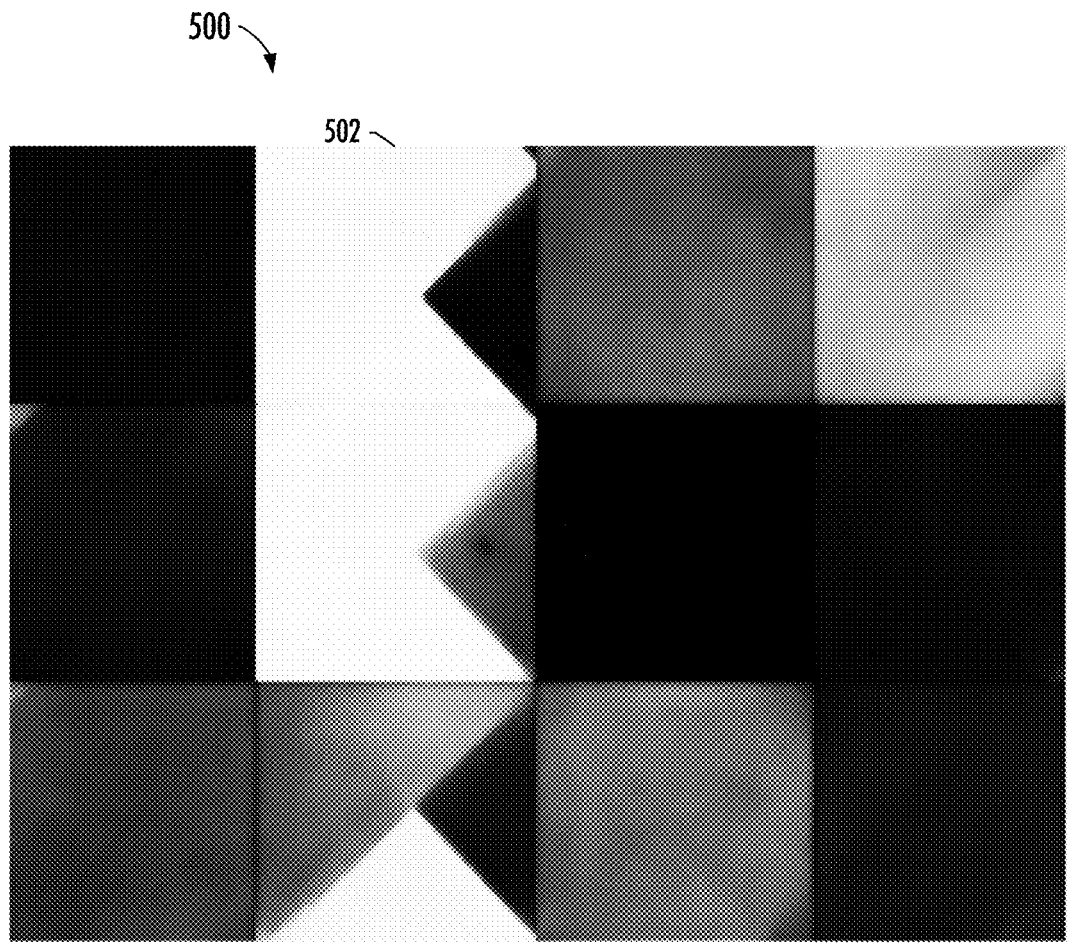
FIG. 5 shows an example composite reconstructed image in accordance with example implementations.

The inspection subsystem 208 is also configured to stitch the reconstructed sub-images 320 into a composite reconstructed image 322. FIG. 5 shows an example composite reconstructed image 500 for the image 100 of FIG. 1, where twelve corresponding probability maps are shown as reconstructed sub-images 502, which are stitched together to form the composite reconstructed image. In FIG. 5, the probabilities that a given sub-image or portion of a sub-image belongs to a particular class are shown in gray-scale. The contrast in probabilities shown in the gray-scale reconstituted sub-images can be used by the inspection system to determine the likely locations of boundaries between an upper layer and a lower layer.

Figure 6:
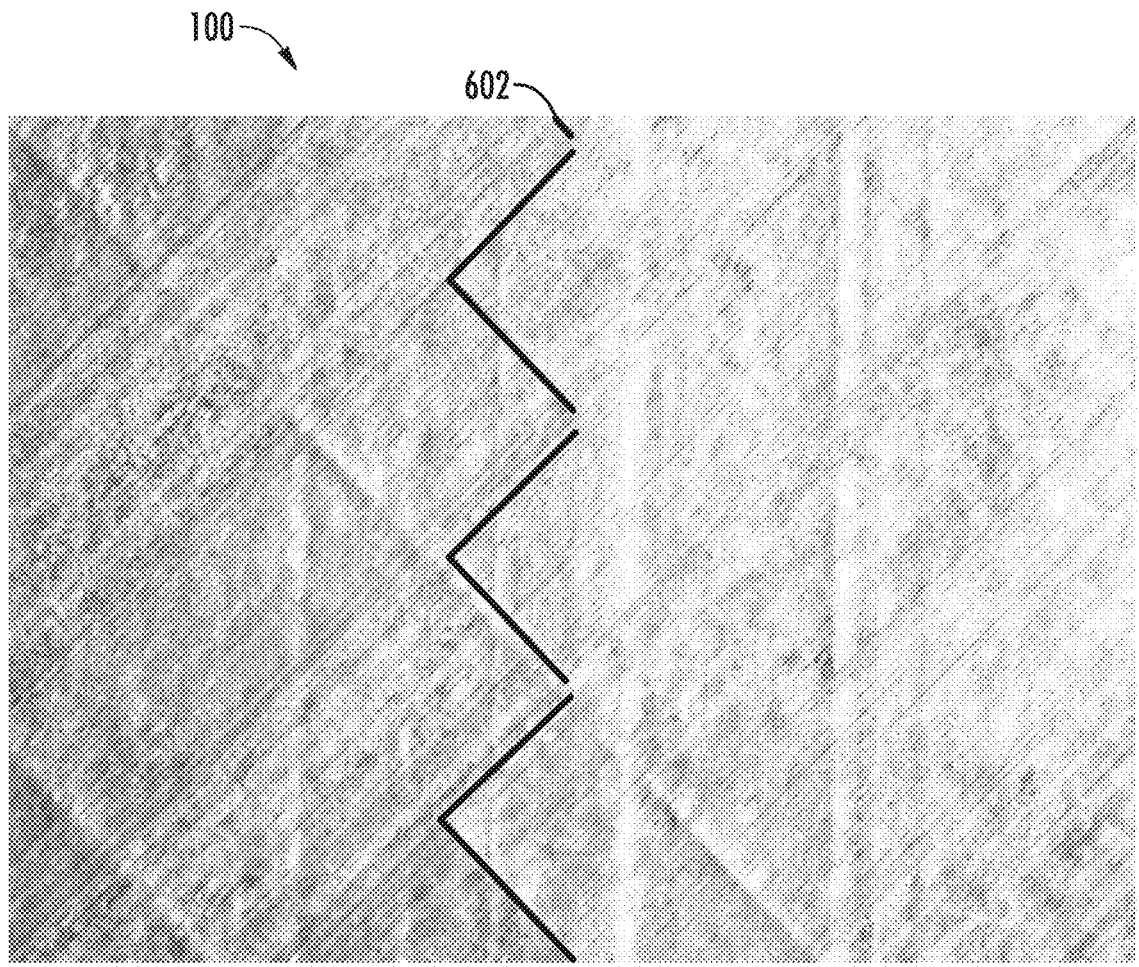
FIG. 6 shows an example image with detected boundaries in accordance with example implementations.

Once the composite reconstructed image 322 has been stitched together from the reconstructed sub-images 320, the inspection subsystem 208 is configured to apply the composite reconstructed image to a feature detector 324 to detect line segments in the composite reconstructed image. FIG. 6 shows the image 100 where the boundaries 602 projected onto the image 100 correspond to line segments that were detected by a feature detector in a composite reconstructed image. The boundaries shown in FIG. 6 correspond to the line segments separating areas in composite reconstructed image 500 in FIG. 5 that have high contrast in a small area. Since the gray-scale values of the pixels in the composite reconstructed image correspond to probabilities that the pixel is an upper layer or lower layer, areas in the composite reconstructed image where areas of high contrast between pixels form line segments can indicate a likely boundary between the upper layer and the lower layer. In FIG. 6, the line segments detected by the feature detector are projected on the original image to provide a visual representation of where likely boundaries between layers appear on the original image.

Figure 7:
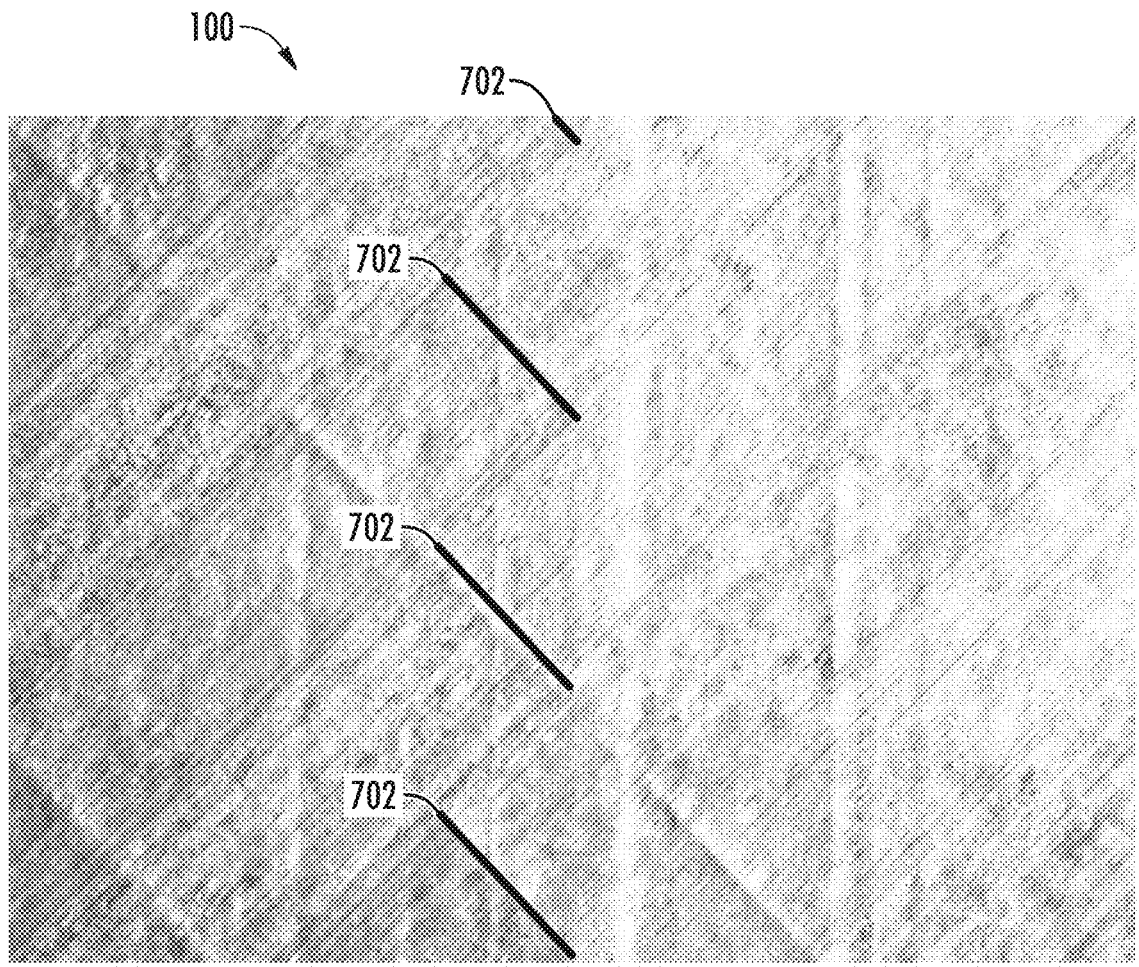
FIG. 7 shows an example image where analyzed line segments are applied to the image in accordance with example implementations.

In some example implementations, the inspection subsystem 208 is also configured to analyze the line segments detected by the feature detector 324 and information from the design repository 212, such as the orientation of the tow end. FIG. 7 shows the image 100 where analyzed line segments 702 are projected onto the image. In some example implementations, the line segments are polylines that correspond to the tow ends 108 of the composite structure 102 shown in FIG. 1. The inspection subsystem may be configured to determine locations of the line segments as locations of the ends of the tows of the upper ply 104.

In some example implementations, the inspection subsystem 208 is further configured to perform a comparison of the locations, such as those marked as line segments 702, to corresponding as-designed locations of the ends of the tows 108 of the upper ply 104, and thereby inspect the composite structure. For example, the inspection subsystem may access design information and/or other information indicating the as-designed locations of the relevant tow ends from a database or other design repository 212. In addition to being configured to perform the comparison of the locations to the corresponding as-designed locations, the inspection subsystem is also configured to produce an output that indicates a result 326 of the comparison for inspection of the composite structure based thereon.

In some example implementations, the result 326 may take the form of an image similar to that shown in FIG. 7, where line segments mark the detected locations of the tow ends. In some example implementations, the result may indicate similarities or differences between the detected locations of the tow ends and the as-designed locations.

In some example implementations, the inspection subsystem 208 is further configured to pseudo-label the reconstructed sub-images 320 and thereby produce pseudo-labeled, reconstructed sub-images. In some example implementations, the inspection subsystem is configured to pseudo-label the reconstructed sub-images by using the locations of the ends of the tows 108 of the upper ply 104. The inspection subsystem may be further configured to assign each of the upper ply and the lower ply 106 to a respective one of object classes 306 or 308 for the upper ply and the lower ply in those of the reconstructed sub-images that include both the upper ply and the lower ply, and assigning both the upper ply and the lower ply to the object class for either the upper ply and the lower ply in those of the reconstructed sub-images that include only one of the upper ply or the lower ply. In some such example implementations, the inspection subsystem 208 may be configured to further add the pseudo-labeled, reconstructed sub-images to the training set of images 304 used to train the machine learning model 312, which can be deployed in the inspection subsystem as the machine learning model 316.

Figure 8:
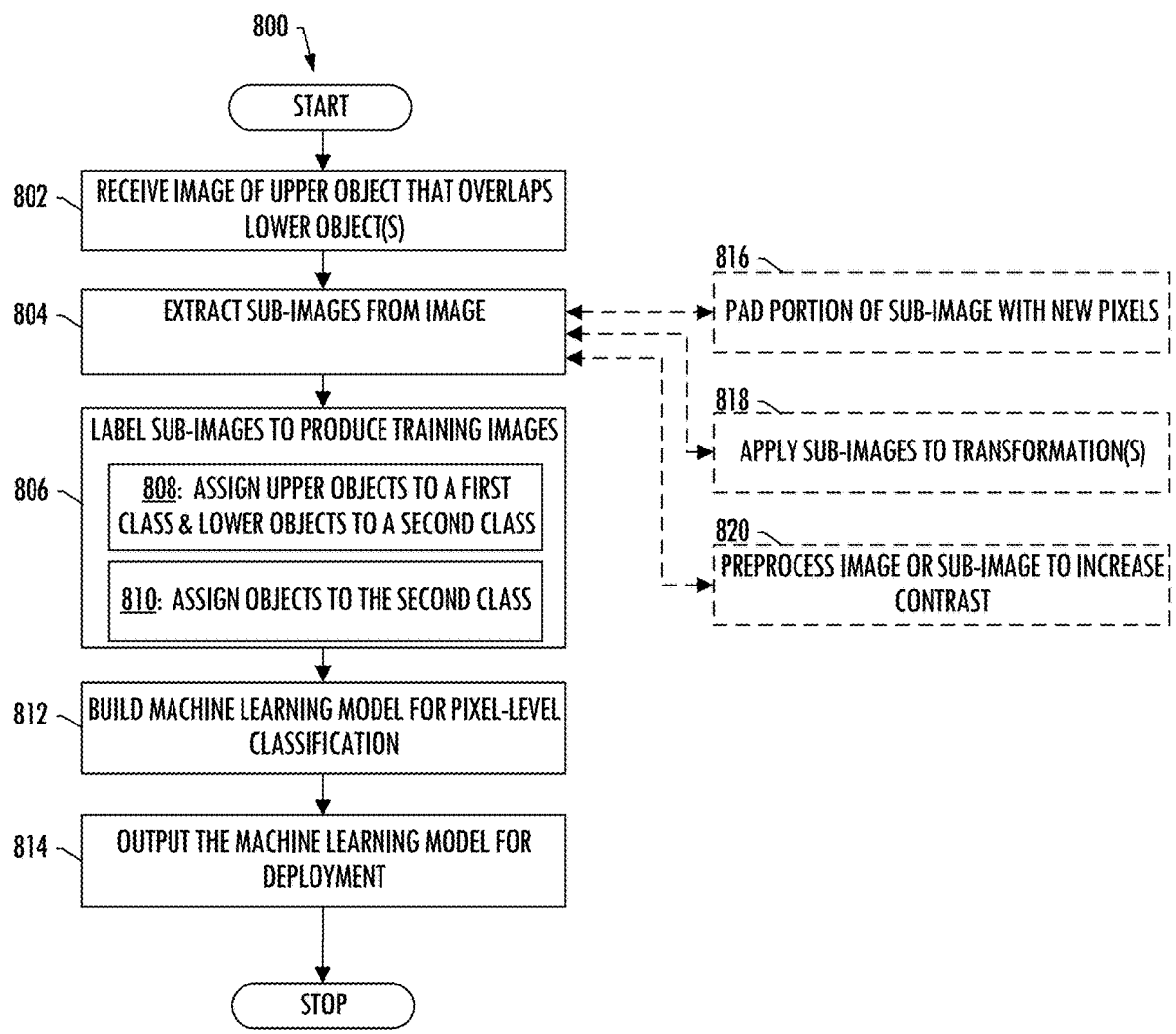
FIG. 8 is a flowchart illustrating various steps in a method of machine learning model development, according to example implementations.

FIG. 8 is a flowchart illustrating various steps in a method 800 of machine learning model development, according to example implementations of the present disclosure. As shown at block 802, the method includes receiving an image of an upper object that overlaps one or more lower objects. Some example implementations of block 802 involve receiving an image of an upper object that overlaps one or more lower objects, and including a boundary between the upper object and a lower object of the one or more lower objects. In some such example implementations, the upper object and the one or more lower objects are respectively an upper ply and one or more lower plies of a composite structure, and the image includes ends of tows of the upper ply that define the boundary between the upper ply and a lower ply of the one or more lower plies.

As shown at block 804, the method 800 also includes extracting sub-images from the image. Multiple approaches may be taken to extract sub-images from the images. For example, extracting the sub-images from the image may involve extracting only sub-images that include both the upper object and the lower object. In another example, a portion of a sub-image may be outside an outer boundary of the image. As shown at block 816, some such example implementations involve extracting the sub-images further includes padding the portion of the sub-image with new pixels. In some example implementations, padding the portion of the sub-image includes padding the portion of the sub-image with the new pixels that have a constant intensity value, or that repeat or mirror intensity values of those pixels on or inside the outer boundary of the image adjacent to the portion.

As shown at block 806, the method 800 also includes labeling the sub-images to produce training images. Some example implementations of block 806 involve labeling the sub-images to produce a training set of images. In some such example implementations, and as shown at block 808, labeling the sub-images to produce a training set of images involves assigning each of the upper object and the lower object to a respective one of a first class and a second class in those of the sub-images that include both the upper object and the lower object. In some such example implementations, as shown at block 810, labeling the sub-images to produce a training set of images further involves assigning both the upper object and the lower object to the second class in those of the sub-images that include only one of the upper object or the lower object.

As shown at block 812, the method 800 also includes building a machine learning model for pixel-level classification. Some example implementations of block 812 involve building a machine learning model for pixel-level classification using the training set of images.

As shown at block 814, the method 800 also includes outputting the machine learning model for deployment. Some example implementations of block 814 involve outputting the machine learning model for deployment in which images are applied to the machine learning model to perform the pixel-level classification in which at least one of the upper object or the lower object are detected in the images.

As shown in FIG. 8, the method 800 may include one or more additional steps. As shown at block 818, some example implementations of the method 800 include applying the sub-images to one or more transformations. Some example implementations of block 818 involve applying at least some of the sub-images in the training set of images to one or more of a plurality of transformations before the machine learning model is built, each sub-image applied to a transformation selected from the plurality of transformations.

As shown at block 820, the method 800 may include preprocessing the image or one or more sub-images to increase contrast. Some example implementations of block 820 involve pre-processing the image or the sub-images to increase contrast before the machine learning model is built, the pre-processing including performing one or more of a standardization, histogram equalization or gamma correction.

Figure 9:
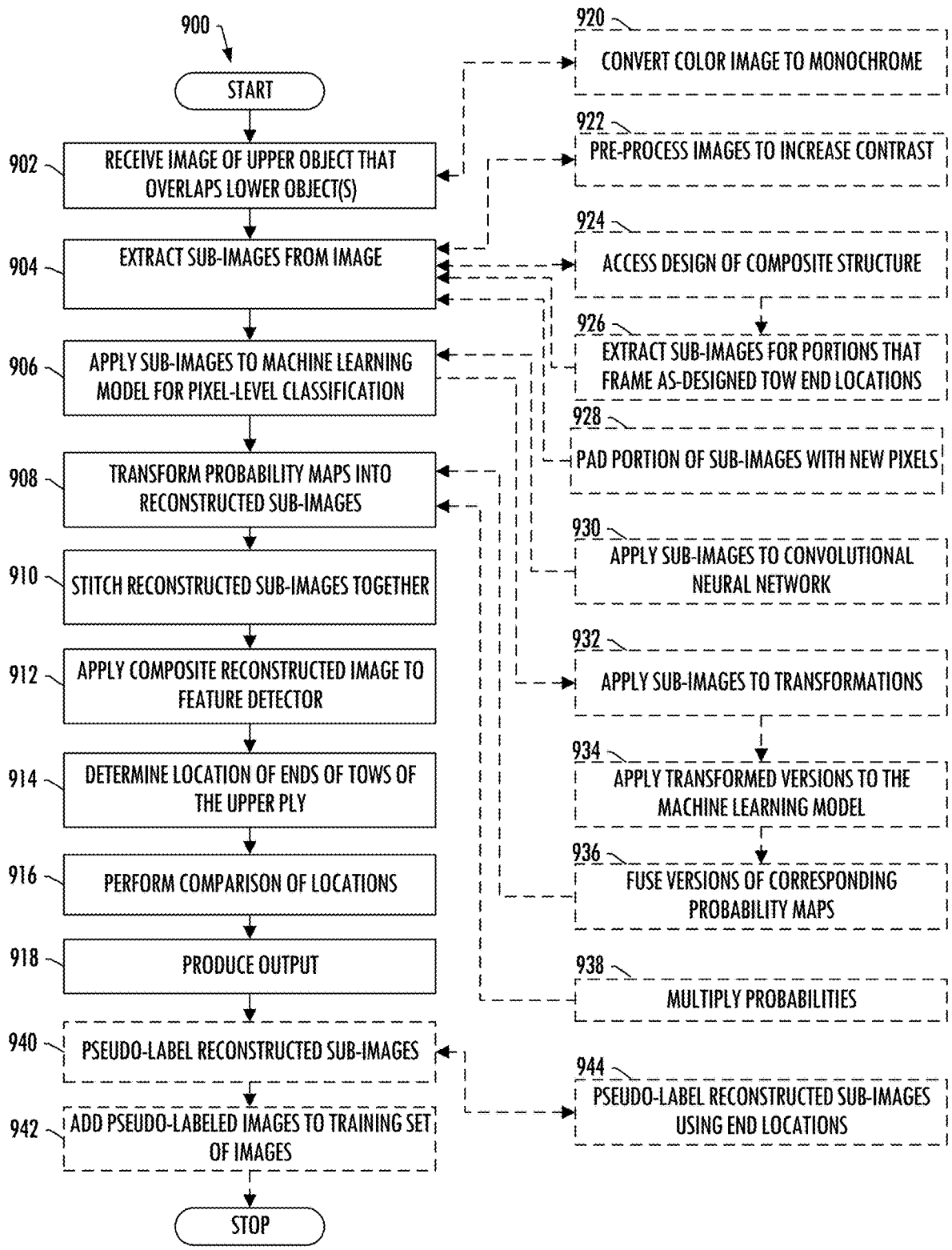
FIG. 9 is a flowchart illustrating various steps in a method of inspecting a composite structure formed of plies that are formed of tows of material, according to example implementations.

FIG. 9 is a flowchart illustrating various steps in a method 900 of inspecting a composite structure formed of plies that are formed of tows of material, according to example implementations of the present disclosure. As shown at block 902, the method includes receiving images of an upper object that overlaps one or more lower objects. Some example implementations of block 902 involve receiving an image of an upper ply that overlaps one or more lower plies of the composite structure, and including ends of tows of the upper ply that define a boundary between the upper ply and a lower ply of the one or more lower plies. In some example implementations, the image is a color image. As shown at block 920, some such example implementations of the method 900 further include converting the color image or the sub-images extracted from the color image to monochromic before the sub-images are applied to the machine learning model.

As shown at block 904, the method 900 also includes extracting sub-images from the image. It will be appreciated that additional operations may be performed in connection with the image and/or sub-images. As shown at block 922, some example implementations of the method 900 further include pre-processing the image or the sub-images to increase contrast before the sub-images are applied to the machine learning model, the pre-processing including performing one or more of a standardization, histogram equalization or gamma correction.

Some example implementations of block 904 involve additional operations. As shown at block 924, exacting the sub-images may involve accessing a design of the composite structure that indicates the as-designed locations of the ends of the tows of the upper ply. As shown at block 926, extracting the sub-images from the image may further involve extracting the sub-images for only those portions of the image that frame the as-designed locations. In some example implementations of block 904, a portion of a sub-image that that frames an as-designed location is outside an outer boundary of the image. As shown at block 928, extracting the sub-images further may further involve padding the portion of the sub-image with new pixels.

As shown at block 906, the method 900 also includes applying sub-images to a machine learning model for pixel-level classification. The machine learning model to which the sub-images are applied may be any machine learning model described or otherwise disclosed herein, and may be trained in accordance with any approach described or otherwise disclosed herein. Some example implementations of block 906 involve applying the sub-images to a machine learning model trained to perform a pixel-level classification in which at least one of the upper ply or the lower ply are detected in the sub-images, and corresponding probability maps are produced in which pixels of the sub-images are associated with probabilities the pixels belong to an object class for the upper ply or the lower ply.

Some example implementations of block 906 involve additional operations. As shown at block 930, applying the sub-images to the machine learning model may involve applying the sub-images to a convolutional neural network having an encoder-decoder architecture. In some example implementations, applying the sub-images to the machine learning model involves for a sub-image of the sub-images one or more further operations, such as those shown at block 932, 934, and 936. As shown at block 932, applying the sub-images to the machine learning model may involve applying the sub-image to transformations selected from a plurality of transformations to produce transformed versions of the sub-image. As shown at block 934, some such example implementations further involve applying the transformed versions of the sub-image to the machine learning model, and the corresponding probability maps include versions of a corresponding probability map for the sub-image. As shown at block 936, some such example implementations further involve fusing the versions of the corresponding probability map to produce the corresponding probability map for the sub-image.

As shown at block 908, the method 900 also includes transforming probability maps into reconstructed sub images. Some example implementations of block 908 involve transforming the corresponding probability maps into reconstructed sub-images. As shown at block 938, some example implementations of transforming the corresponding probability maps include multiplying the probabilities the pixels belong to the object class for the upper ply or the lower ply with a specific intensity value to obtain pixel values of the reconstructed sub-images.

As shown at block 910, the method 900 also includes stitching the reconstructed sub-images together. Some example implementations of block 910 involve stitching the reconstructed sub-images into a composite reconstructed image.

As shown at block 912, the method 900 also includes applying the composite reconstructed image to a feature detector. Some example implementations of block 912 involve applying the composite reconstructed image to a feature detector to detect line segments in the composite reconstructed image.

As shown at block 914, the method 900 also includes determining the location of ends of tows of the upper ply. Some example implementations of block 914 involve determining locations of the line segments as locations of the ends of the tows of the upper ply.

As shown at block 916, the method 900 also includes performing a comparison of locations. Some example implementations of block 916 involve performing a comparison of the locations to corresponding as-designed locations of the ends of the tows of the upper ply, and thereby inspecting the composite structure.

As shown at block 918, the method 900 also includes producing an output. Some example implementations of block 918 involve producing an output that indicates a result of the comparison for inspection of the composite structure based thereon.

As shown at block 940, the method 900 may further include pseudo-labeling the reconstructed sub-images. Some example implementations of block 940 involve pseudo-labeling the reconstructed sub-images and thereby producing pseudo-labeled, reconstructed sub-images, including assigning each of the upper ply and the lower ply to a respective one of object classes for the upper ply and the lower ply in those of the reconstructed sub-images that include both the upper ply and the lower ply, and assigning both the upper ply and the lower ply to the object class for either the upper ply and the lower ply in those of the reconstructed sub-images that include only one of the upper ply or the lower ply. As shown at block 944, some example implementations of pseudo-labeling the reconstructed sub-images include pseudo-labeling the reconstructed sub-images using the locations of the ends of the tows of the upper ply.

As shown at block 942, the method 900 may further include adding pseudo-labeled images to a training set of images. Some example implementations of block 942 involve adding the pseudo-labeled, reconstructed sub-images to a training set of images used to train the machine learning model.

According to example implementations of the present disclosure, the system 200 and its subsystems including the camera 202, the machine learning model development subsystem 206, the inspection subsystem 208, the image repository 210, the design repository 212, the transformation subsystem 310, 328, the machine learning model 312, 316, and the feature detector 324. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 10:
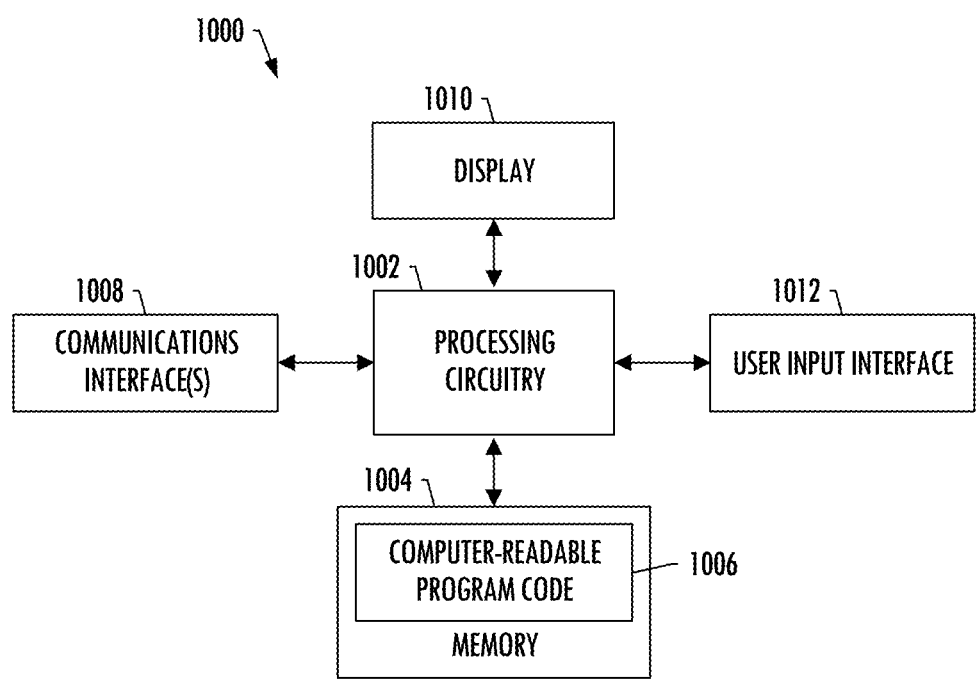
FIG. 10 illustrates an apparatus according to some example implementations.

FIG. 10 illustrates an apparatus 1000 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will conic to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of inspecting a composite structure formed of plies that are formed of tows of material, the method comprising:
   receiving an image of an upper ply that overlaps one or more lower plies of the composite structure, and including ends of tows of the upper ply that define a boundary between the upper ply and a lower ply of the one or more lower plies;
   extracting sub-images from the image;
   applying the sub-images to a machine learning model trained to perform a pixel-level classification in which at least one of the upper ply or the lower ply are detected in the sub-images, and corresponding probability maps are produced in which pixels of the sub-images are associated with probabilities the pixels belong to an object class for the upper ply or the lower ply;
   transforming the corresponding probability maps into reconstructed sub-images;
   stitching the reconstructed sub-images into a composite reconstructed image;
   applying the composite reconstructed image to a feature detector to detect line segments in the composite reconstructed image;
   determining locations of the line segments as locations of the ends of the tows of the upper ply;
   performing a comparison of the locations to corresponding as-designed locations of the ends of the tows of the upper ply, and thereby inspecting the composite structure; and
   producing an output that indicates a result of the comparison for inspection of the composite structure based thereon.

2. The method of claim 1, wherein the image is a color image, and the method further comprises converting the color image or the sub-images extracted from the color image to monochromic before the sub-images are applied to the machine learning model.

3. The method of claim 1 further comprising pre-processing the image or the sub-images to increase contrast before the sub-images are applied to the machine learning model, the pre-processing including performing one or more of a standardization, histogram equalization or gamma correction.

4. The method of claim 1, wherein extracting the sub-images from the image comprises:
   accessing a design of the composite structure that indicates the as-designed locations of the ends of the tows of the upper ply; and
   extracting the sub-images for only those portions of the image that frame the as-designed locations.

5. The method of claim 1, wherein a portion of a sub-image that frames an as-designed location is outside an outer boundary of the image, and extracting the sub-images further includes padding the portion of the sub-image with new pixels.

6. The method of claim 1, wherein applying the sub-images to the machine learning model includes applying the sub-images to a convolutional neural network having an encoder-decoder architecture.

7. The method of claim 1, wherein applying the sub-images to the machine learning model includes for a sub-image of the sub-images:
   applying the sub-image to transformations selected from a plurality of transformations to produce transformed versions of the sub-image;
   applying the transformed versions of the sub-image to the machine learning model, and the corresponding probability maps include versions of a corresponding probability map for the sub-image; and
   fusing the versions of the corresponding probability map to produce the corresponding probability map for the sub-image.

8. The method of claim 1, wherein transforming the corresponding probability maps includes multiplying the probabilities the pixels belong to the object class for the upper ply or the lower ply with a specific intensity value to obtain pixel values of the reconstructed sub-images.

9. The method of claim 1 further comprising:
   pseudo-labeling the reconstructed sub-images and thereby producing pseudo-labeled, reconstructed sub-images, including assigning each of the upper ply and the lower ply to a respective one of object classes for the upper ply and the lower ply in those of the reconstructed sub-images that include both the upper ply and the lower ply, and assigning both the upper ply and the lower ply to the object class for either the upper ply and the lower ply in those of the reconstructed sub-images that include only one of the upper ply or the lower ply; and adding the pseudo-labeled, reconstructed sub-images to a training set of images used to train the machine learning model.

10. The method of claim 9, wherein pseudo-labeling the reconstructed sub-images includes pseudo-labeling the reconstructed sub-images using the locations of the ends of the tows of the upper ply.

11. The method of claim 1, further comprising:
receiving an image of an upper object being the upper ply of the composite structure that overlaps one or more lower objects being the lower plies of the composite structure, and including a boundary between the upper object and a lower object of the one or more lower objects;
labeling the sub-images to produce a training set of images, including assigning each of the upper object and the lower object to a respective one of a first class and a second class in those of the sub-images that include both the upper object and the lower object, and assigning both the upper object and the lower object to the second class in those of the sub-images that include only one of the upper object or the lower object;
building the machine learning model for pixel-level classification using the training set of images; and
outputting the machine learning model for deployment in which images are applied to the machine learning model to perform the pixel-level classification in which at least one of the upper object or the lower object are detected in the images.

12. The method of claim 11, wherein extracting the sub-images from the image includes extracting only the sub-images that include both the upper object and the lower object.

13. The method of claim 11 further comprising applying at least some of the sub-images in the training set of images to one or more of a plurality of transformations before the machine learning model is built, each sub-image applied to a transformation selected from the plurality of transformations.

14. The method of claim 11 further comprising pre-processing the image or the sub-images to increase contrast before the machine learning model is built, the pre-processing including performing one or more of a standardization, histogram equalization or gamma correction.

15. The method of claim 11, wherein a portion of a sub-image is outside an outer boundary of the image, and extracting the sub-images further includes padding the portion of the sub-image with new pixels.

16. The method of claim 15, wherein padding the portion of the sub-image includes padding the portion of the sub-image with the new pixels that have a constant intensity value, or that repeat or mirror intensity values of those pixels on or inside the outer boundary of the image adjacent to the portion.

17. An apparatus for inspecting a composite structure formed of plies that are formed of tows of material, the apparatus comprising:
a memory configured to store computer-readable program code; and
processing circuitry configured to access the memory, and execute the computer-readable program code to cause the apparatus to at least:

receive an image of an upper ply that overlaps one or more lower plies of the composite structure, and including ends of tows of the upper ply that define a boundary between the upper ply and a lower ply of the one or more lower plies;
extract sub-images from the image;
apply the sub-images to a machine learning model trained to perform a pixel-level classification in which at least one of the upper ply or the lower ply are detected in the sub-images, and corresponding probability maps are produced in which pixels of the sub-images are associated with probabilities the pixels belong to an object class for the upper ply or the lower ply;
transform the corresponding probability maps into reconstructed sub-images;
stitch the reconstructed sub-images into a composite reconstructed image;
apply the composite reconstructed image to a feature detector to detect line segments in the composite reconstructed image;
determine locations of the line segments as locations of the ends of the tows of the upper ply;
perform a comparison of the locations to corresponding as-designed locations of the ends of the tows of the upper ply, and thereby inspecting the composite structure; and
produce an output that indicates a result of the comparison for inspection of the composite structure based thereon.

18. The apparatus of claim 17, wherein the image is a color image, and wherein the processing circuitry is configured to execute the computer-readable program code to cause the apparatus to at least: convert the color image or the sub-images extracted from the color image to monochromic before the sub-images are applied to the machine learning model.

19. The apparatus of claim 17 wherein the processing circuitry is configured to execute the computer-readable program code to cause the apparatus to at least:
pre-process the image or the sub-images to increase contrast before the sub-images are applied to the machine learning model, the pre-processing including performing one or more of a standardization, histogram equalization or gamma correction.

20. The apparatus of claim 17, wherein the apparatus being configured to extract the sub-images from the image comprises the apparatus being configured to at least:
access a design of the composite structure that indicates the as-designed locations of the ends of the tows of the upper ply; and
extract the sub-images for only those portions of the image that frame the as-designed locations.

21. The apparatus of claim 17, wherein a portion of a sub-image that frames an as-designed location is outside an outer boundary of the image, and wherein the apparatus being configured to extract the sub-images further includes the apparatus being configured to at least pad the portion of the sub-image with new pixels.

22. The apparatus of claim 17, wherein the apparatus being configured to apply the sub-images to the machine learning model includes the apparatus being configured to apply the sub-images to a convolutional neural network having an encoder-decoder architecture.

23. The apparatus of claim 17, wherein the apparatus being configured to apply the sub-images to the machine learning model includes the apparatus being configured to, for a sub-image of the sub-images:

apply the sub-image to transformations selected from a plurality of transformations to produce transformed versions of the sub-image;

apply the transformed versions of the sub-image to the machine learning model, and the corresponding probability maps include versions of a corresponding probability map for the sub-image; and fuse the versions of the corresponding probability map to produce the corresponding probability map for the sub-image.

24. The apparatus of claim 17, wherein the apparatus being configured to transform the corresponding probability maps includes the apparatus being configured to multiply the probabilities the pixels belong to the object class for the upper ply or the lower ply with a specific intensity value to obtain pixel values of the reconstructed sub-images.

25. The apparatus of claim 17 wherein the processing circuitry is configured to execute the computer-readable program code to cause the apparatus to at least:

pseudo-label the reconstructed sub-images and thereby produce pseudo-labeled, reconstructed sub-images, including assigning each of the upper ply and the lower ply to a respective one of object classes for the upper ply and the lower ply in those of the reconstructed sub-images that include both the upper ply and the lower ply, and assigning both the upper ply and the lower ply to the object class for either the upper ply and the lower ply in those of the reconstructed sub-images that include only one of the upper ply or the lower ply; and add the pseudo-labeled, reconstructed sub-images to a training set of images used to train the machine learning model.

26. The apparatus of claim 25, wherein the apparatus being configured to pseudo-label the reconstructed sub-images includes the apparatus being configured to pseudo-label the reconstructed sub-images using the locations of the ends of the tows of the upper ply.

27. The apparatus of claim 17, wherein the processing circuitry is configured to execute the computer-readable program code to cause the apparatus to at least:

receive an image of an upper object being the upper ply of the composite structure that overlaps one or more lower objects being the lower plies of the composite structure, and including a boundary between the upper object and a lower object of the one or more lower objects;

label the sub-images to produce a training set of images, including assigning each of the upper object and the lower object to a respective one of a first class and a second class in those of the sub-images that include both the upper object and the lower object, and assigning both the upper object and the lower object to the second class in those of the sub-images that include only one of the upper object or the lower object;

build the machine learning model for pixel-level classification using the training set of images; and output the machine learning model for deployment in which images are applied to the machine learning model to perform the pixel-level classification in which at least one of the upper object or the lower object are detected in the images.

28. The apparatus of claim 27, wherein the apparatus being caused to extract the sub-images from the image includes the apparatus being configured to extract only the sub-images that include both the upper object and the lower object.

29. The apparatus of claim 27, wherein the processing circuitry is configured to execute the computer-readable program code to cause the apparatus to at least:

apply at least some of the sub-images in the training set of images to one or more of a plurality of transformations before the machine learning model is built, each sub-image applied to a transformation selected from the plurality of transformations.

30. The apparatus of claim 27, wherein the processing circuitry is configured to execute the computer-readable program code to cause the apparatus to at least:

pre-process the image or the sub-images to increase contrast before the machine learning model is built, the pre-processing including performing one or more of a standardization, histogram equalization or gamma correction.

31. The apparatus of claim 27, wherein a portion of a sub-image is outside an outer boundary of the image, and wherein the apparatus being caused to extract the sub-images further includes the apparatus being caused to pad the portion of the sub-image with new pixels.

32. The apparatus of claim 31, wherein the apparatus being caused to pad the portion of the sub-image includes the apparatus being caused to pad the portion of the sub-image with the new pixels that have a constant intensity value, or that repeat or mirror intensity values of those pixels on or inside the outer boundary of the image adjacent to the portion.

* * * * *